(12) United States Patent
Schumacher et al.

(10) Patent No.: US 12,014,613 B2
(45) Date of Patent: Jun. 18, 2024

(54) MOBILE DEVICE USAGE MONITORING FOR COMMERCIAL VEHICLE FLEET MANAGEMENT

(71) Applicant: Stoneridge Electronics, AB, Solna (SE)

(72) Inventors: Darren Schumacher, Ann Arbor, MI (US); Stuart Adams, Murthly (GB); Nathan Schuler, Fort Wayne, IN (US); Dominik Marx, Novi, MI (US)

(73) Assignee: STONERIDGE ELECTRONICS, AB, Solna (SE)

( * ) Notice: Subject to any disclaimer, the term of this patent is extended or adjusted under 35 U.S.C. 154(b) by 415 days.

(21) Appl. No.: 16/845,228

(22) Filed: Apr. 10, 2020

(65) Prior Publication Data
US 2020/0327345 A1 Oct. 15, 2020

Related U.S. Application Data

(60) Provisional application No. 62/833,252, filed on Apr. 12, 2019.

(51) Int. Cl.
*G08B 21/06* (2006.01)
*B60W 30/095* (2012.01)
(Continued)

(52) U.S. Cl.
CPC ......... *G08B 21/06* (2013.01); *B60W 30/0956* (2013.01); *B60W 40/08* (2013.01);
(Continued)

(58) Field of Classification Search
CPC ...... G06V 20/597; G06V 20/40; G06V 20/58; G06V 20/44; B60W 30/0956;
(Continued)

(56) References Cited

U.S. PATENT DOCUMENTS 6,681,195 B1 1/2004 Poland et al.
10,068,140 B2 9/2018 Levkova et al.
(Continued)

FOREIGN PATENT DOCUMENTS

CN 103395404 A 11/2013
CN 108960065 12/2018
(Continued)

OTHER PUBLICATIONS

International Search Report and Written Opinion for International Application No. PCT/US2020/027639 dated Sep. 16, 2020.
(Continued)

*Primary Examiner* — Maceeh Anwari
(74) *Attorney, Agent, or Firm* — Carlson, Gaskey & Olds, P.C.

(57) ABSTRACT

A driver monitoring system according to an example of the present disclosure includes a camera configured to record images of a driver within a cabin of a vehicle. At least one vehicle sensor is configured to detect an anomalous driving event of the vehicle based on predefined criteria. A controller is in communication with the camera and the at least one vehicle sensor. The controller is configured to, based on the detection, obtain a particular image taken by the camera that depicts the driver during the anomalous event. The controller is configured to transmit the particular image to a fleet manager, store the particular image in a local repository of anomalous driving images, or both.

13 Claims, 6 Drawing Sheets

(51) Int. Cl.
- *B60W 40/08* (2012.01)
- *B60W 40/10* (2012.01)
- *B60W 50/14* (2020.01)
- *G06F 18/21* (2023.01)
- *G06N 3/04* (2023.01)
- *G06N 3/08* (2023.01)
- *G06V 20/40* (2022.01)
- *G06V 20/58* (2022.01)
- *G06V 20/59* (2022.01)
- *G08G 1/00* (2006.01)
- *H04N 7/18* (2006.01)
- *H04N 23/54* (2023.01)

(52) U.S. Cl.
CPC ............ *B60W 40/10* (2013.01); *B60W 50/14* (2013.01); *G06F 18/21* (2023.01); *G06N 3/04* (2013.01); *G06N 3/08* (2013.01); *G06V 20/40* (2022.01); *G06V 20/58* (2022.01); *G06V 20/597* (2022.01); *G08G 1/20* (2013.01); *H04N 7/183* (2013.01); *H04N 23/54* (2023.01); *B60W 2420/403* (2013.01); *B60W 2510/18* (2013.01); *B60W 2510/20* (2013.01); *B60W 2520/00* (2013.01); *B60W 2540/225* (2020.02); *B60W 2555/20* (2020.02); *G06V 20/44* (2022.01)

(58) Field of Classification Search
CPC ...... B60W 40/08; B60W 40/10; B60W 50/14; B60W 2420/42; B60W 2510/18; B60W 2510/20; B60W 2520/00; B60W 2540/225; B60W 2555/20; B60W 40/00; B60W 40/107; B60W 50/0098; B60W 2050/0043; B60W 2050/0075; B60W 2050/146; B60W 2520/105; B60W 2552/50; B60W 2556/45; G06K 9/6217; G06N 3/04; G06N 3/08; G08G 1/20; H04N 5/2253; H04N 7/183; G08B 21/06; G07C 5/008; G07C 5/0841

USPC ........................................................ 382/102
See application file for complete search history.

(56) References Cited

U.S. PATENT DOCUMENTS

| | | | |
|---|---|---|---|
| 10,181,266 | B2 | 1/2019 | Gupta et al. |
| 10,196,071 | B1 | 2/2019 | Rowson et al. |
| 2018/0231976 | A1 | 8/2018 | Singh |
| 2020/0057487 | A1* | 2/2020 | Sicconi ................... G06T 7/254 |

FOREIGN PATENT DOCUMENTS

| | | |
|---|---|---|
| JP | 2007299048 A | 11/2007 |
| JP | 2011034215 A | 2/2011 |
| JP | 5040851 | 10/2012 |
| KR | 20130095144 A | 8/2013 |

OTHER PUBLICATIONS

International Preliminary Report on Patentability for International Application No. PCT/US2020/027639 dated Oct. 21, 2021.
Seeing Machines, Guardian, "Driver Fatigue Monitoring System: Guardian by Seeing Machines—Guardian," downloaded from https://www.seeingmachines.com/guardian/guardian/ on Mar. 13, 2019.
Samsara, "AI Dash Cams." Downloaded from https://www.samsara.com/fleet/dash-cam on Apr. 10, 2020.

\* cited by examiner

MOBILE DEVICE USAGE MONITORING FOR COMMERCIAL VEHICLE FLEET MANAGEMENT

CROSS-REFERENCE TO RELATED APPLICATIONS

This application claims priority to U.S. Provisional Application No. 62/833,252 which was filed on Apr. 12, 2019, and is incorporated herein by reference in its entirety.

BACKGROUND

This application relates to driver monitoring, and more particularly to recording images depicting a driver during anomalous driving events.

Safety costs in the commercial vehicle space have been rising dramatically, with distracted driving being a primary cause of accidents. Cellular phone usage is believed to be a major contributor to these types of distracted driver accidents.

SUMMARY

A driver monitoring system according to an example of the present disclosure includes a camera configured to record images of a driver within a cabin of a vehicle. At least one vehicle sensor is configured to detect an anomalous driving event of the vehicle based on predefined criteria. A controller is in communication with the camera and the at least one vehicle sensor. The controller is configured to, based on the detection, obtain a particular image taken by the camera that depicts the driver during the anomalous event. The controller is configured to transmit the particular image to a fleet manager, store the particular image in a local repository of anomalous driving images, or both.

In a further embodiment of any of the foregoing embodiments, the controller is in communication with the at least one vehicle sensor through a controller area network bus of the vehicle.

In a further embodiment of any of the foregoing embodiments, the at least one vehicle sensor includes at least one of the following: an acceleration sensor configured to detect an anomalous acceleration event, a steering angle sensor configured to detect an anomalous steering event, a braking sensor operable to detect an anomalous braking event, and an object detection sensor operable to detect a near collision.

In a further embodiment of any of the foregoing embodiments, the controller is configured to adjust the predefined criteria based on at least one of traffic density, weather conditions, and object detection in the vicinity of the vehicle.

In a further embodiment of any of the foregoing embodiments, the controller is configured to determine the predefined criteria based on an experience level of the driver.

In a further embodiment of any of the foregoing embodiments, the controller is operable to obtain the particular image from a rolling video buffer recorded within a time window corresponding to the anomalous event.

In a further embodiment of any of the foregoing embodiments, the controller is configured to record additional images depicting the driver from the camera at random intervals, and transmit the additional images to a fleet manager, store the additional images in the local repository of anomalous driving images, or both.

A driver monitoring system according to an example of the present disclosure includes a gaze tracking camera configured to record images of a driver within a cabin of a vehicle and determine a gaze direction of the driver in the recorded images. A controller is in communication with the gaze tracking camera and is configured to detect a potential distracted driving event based on the gaze direction of the driver as depicted in a particular image of the recorded images being outside of a predefined alert driver area for an amount of time exceeding a predefined time threshold. The controller is configured to perform one or both of the following predefined actions based on the potential distracted driving event: transmission of the particular image to a fleet manager, and storage of the particular image in a local repository of anomalous driving images.

In a further embodiment of any of the foregoing embodiments, the controller is configured to, based on the detected potential distracted driving event, provide the particular image to a convolutional neural network that has been trained with images depicting drivers utilizing mobile devices, and determine, based on feedback from the convolutional neural network, whether the driver is utilizing a mobile device in the particular image. The performance of the predefined action is further based on the determination of whether the driver is utilizing a mobile device in the particular image.

In a further embodiment of any of the foregoing embodiments, the controller is configured to, based on a determination that the driver is not utilizing a mobile device in the particular image, omit performance of one or both of the predefined actions and further train the convolutional neural network using the particular image.

In a further embodiment of any of the foregoing embodiments, the controller is configured to transmit one or more of the following distracted driving alerts to the driver based on the potential distracted driving event: an audio notification through a vehicle speaker, an audio notification to a wireless headset worn by the driver, and a visual notification on an electronic display within the cabin.

In a further embodiment of any of the foregoing embodiments, the gaze tracking camera is a video camera, and the images are recorded in a video feed from the video camera.

In a further embodiment of any of the foregoing embodiments, the controller is configured to adjust one or both of the predefined time threshold and the predefined alert driver area based on at least one of traffic density, weather conditions, object detection external to the vehicle, and a geographic location of the vehicle.

In a further embodiment of any of the foregoing embodiments, the controller is configured to select one or both of the predefined time threshold and the predefined alert driver area based on an experience level of the driver.

In a further embodiment of any of the foregoing embodiments, the controller is configured to obtain additional images depicting the driver from the gaze tracking camera, or another camera, at random intervals, and transmit the additional images to a fleet manager, store the additional images in the local repository of anomalous driving images, or both.

A method of monitoring a driver according to an example of the present disclosure includes recording images of a driver within a cabin of a vehicle using a vehicle camera, detecting an anomalous driving event of the vehicle based on input from at least one vehicle sensor, obtaining a particular image from the camera depicting the driver during the anomalous event, and performing at least one of transmitting the particular image to a fleet manager and storing the particular image in a local repository of anomalous driving images.

In a further embodiment of any of the foregoing embodiments, the detecting of the anomalous driving event of the vehicle includes detecting one of more of an anomalous acceleration event, an anomalous steering event, an anomalous braking event, and a near collision.

A method of monitoring a driver according to an example of the present disclosure includes recording images of a driver within a cabin of a vehicle, determining a gaze direction of the driver in the recorded images, and detecting a potential distracted driving event based on the gaze direction of the driver, as depicted in a particular image of the recorded images, being outside of a predefined alert driver area for an amount of time exceeding a predefined time threshold. The method includes, based on the detecting, performing at least one of transmitting the particular image to a fleet manager and storing the particular image in a local repository of anomalous driving images.

In a further embodiment of any of the foregoing embodiments, the method includes, based on the potential distracted driving event, providing the particular image to a convolutional neural network that has been trained with mobile device usage images depicting drivers utilizing mobile devices, and determining, based on feedback from the convolutional neural network, whether the driver is utilizing a mobile device in the particular image. The performance of the at least one predefined action is further based on the determination of whether the driver is utilizing a mobile device in the particular image.

In a further embodiment of any of the foregoing embodiments, the method includes, based on a determination that the driver is not utilizing a mobile device in the particular image, omitting performance of one or both of the predefined actions, and further training the convolutional neural network using the particular image.

A driver monitoring system according to an example of the present disclosure includes a wireless activity detector configured to detect signaling from a mobile device within a cabin of a vehicle, a camera configured to record images of a driver within the cabin of the vehicle, and a controller in communication with the camera and wireless activity detector. The controller is configured to, based on the detected signaling, obtain a particular image taken by the camera that depicts the driver, and transmit the particular image to a fleet manager, store the particular image in a local repository of anomalous driving images, or both.

A method of monitoring a driver according to an example of the present disclosure includes detecting wireless signaling from a mobile device within a cabin of a vehicle. The method includes, based on the detected wireless signaling: recording an image of a driver within the cabin of the vehicle, and transmitting the particular image to a fleet manager, store the particular image in a local repository of anomalous driving images, or both.

The embodiments, examples, and alternatives of described in the claims and in the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
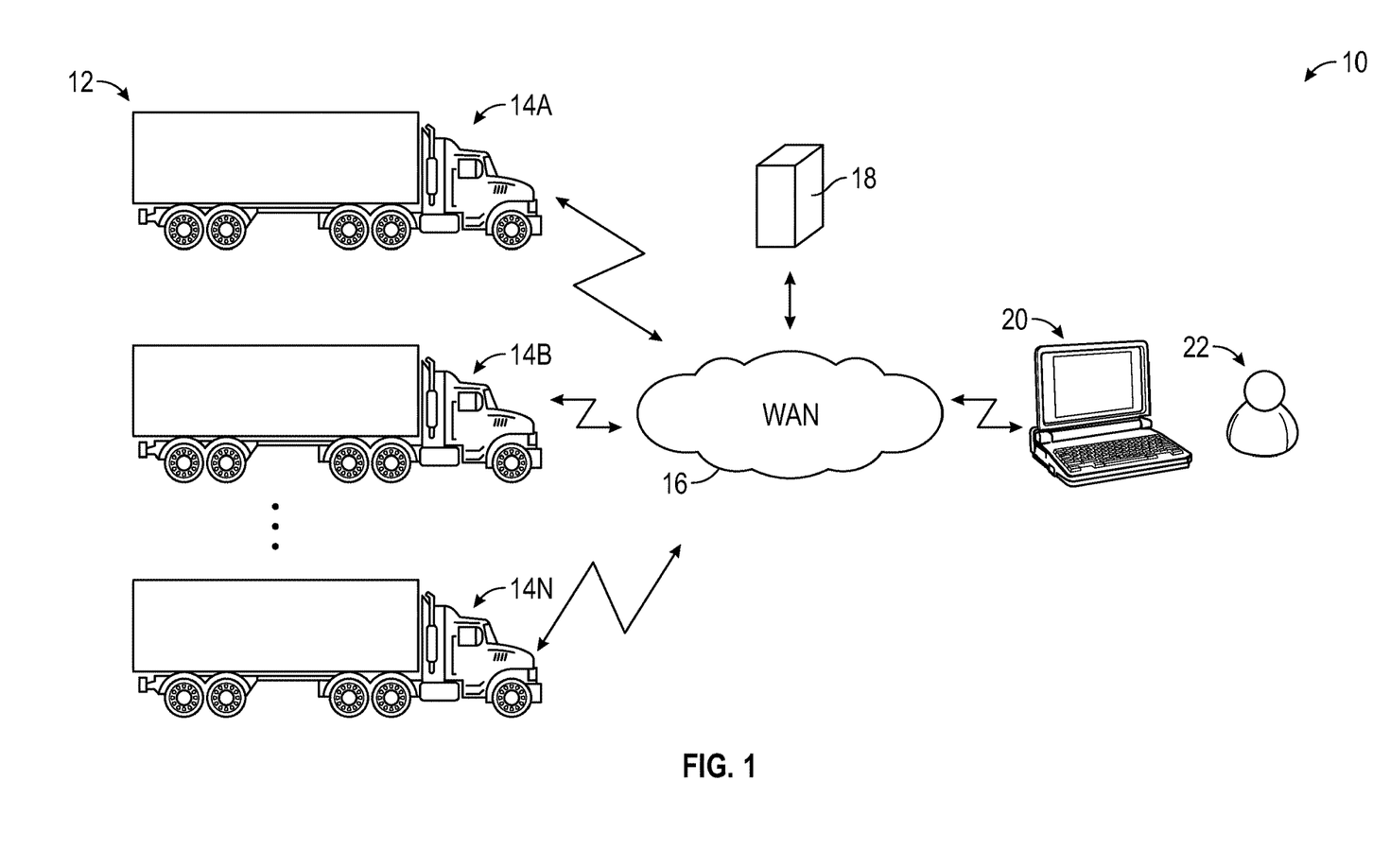
FIG. 1 schematically illustrates an example fleet management system.

FIG. 1 schematically illustrates an example fleet management system 10 that includes a fleet 12 of vehicles 14A-N operable to communicate with a fleet manager 22 through a wide area network ("WAN") 16, such as the Internet. The vehicles 14 are operable to record images depicting drivers of the vehicles 14, and to store or transmit those images, optionally along with associated event data describing how the vehicles 14 are being operated (e.g., acceleration events, steering events, braking events, near collisions, etc.).

In one example, the vehicles 14A-N transmit the images and/or event data to the fleet manager 22 by transmitting the images to a fleet management server 18, where they can be accessed by a computing device 20 of the fleet manager 22 that supervises the fleet 12. In one example, the vehicles 14A-N can transmit the images and/or event data to the fleet manager 22 by transmitting to the computing device 20 of the fleet manager 22, bypassing the fleet management server 18. In one example, in addition to or as an alternative to transmitting the images to the fleet manager 22, the vehicles 14 store the images in a local repository in the vehicles 14. In one example, whether a given image is transmitted via the WAN 16 or is stored in the local repository is based on whether the vehicle 14 currently has connectivity to the WAN 16. In the example of FIG. 1, the vehicles 14 are trucks, but it is understood that other commercial vehicles could be used, such as delivery vans and the like.

Figure 2:
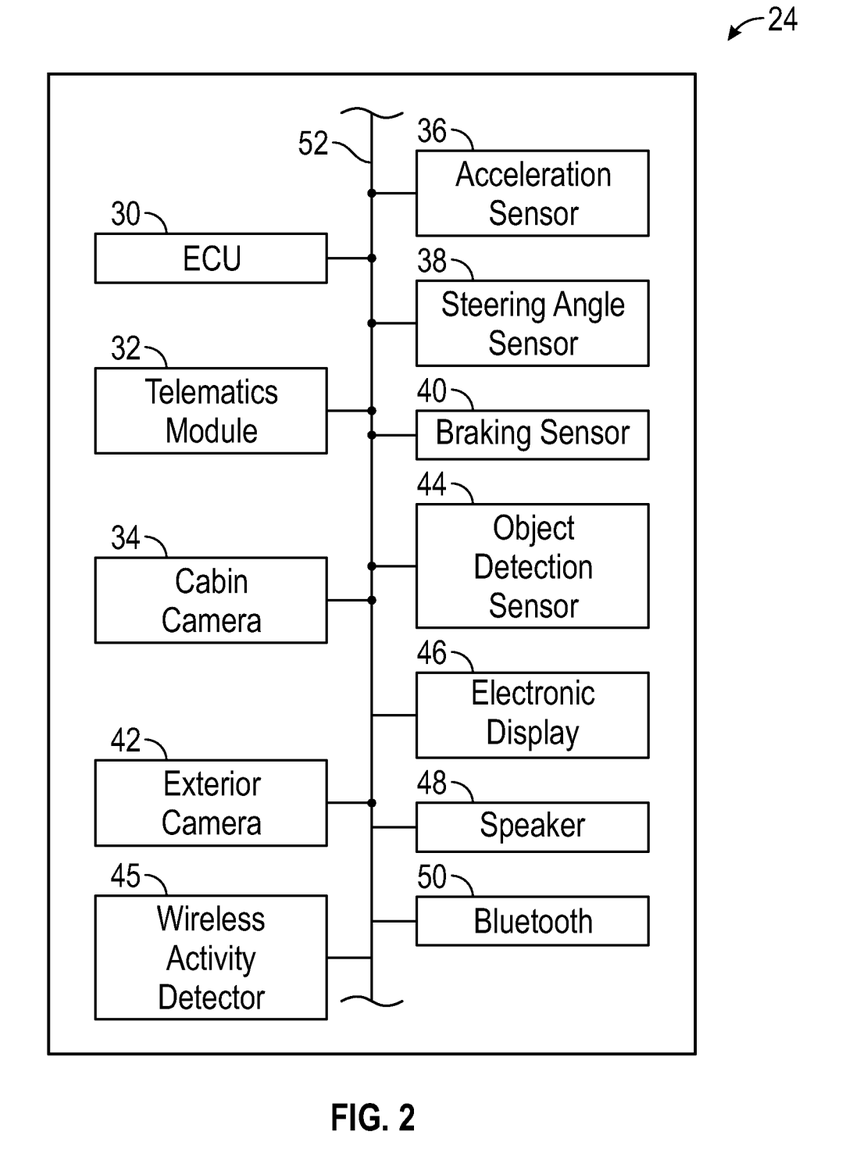
FIG. 2 schematically illustrates components of an example driver monitoring system for each vehicle in FIG. 1.

FIG. 2 schematically illustrates components of an example driver monitoring system 24 provided in each vehicle 14. In the example of FIG. 2, the driver monitoring system 24 includes an electronic control unit (ECU) 30 which is operably connected to a telematics module 32, a cabin camera 34, an acceleration sensor 36, a steering angle sensor 38, and a braking sensor 40. Although three sensors 34-38 are described, it is understood that fewer or more sensors could be used. For example, the ECU 30 may be operably connected to an exterior camera 42 operable to record images of a surrounding environment of the vehicle 14, an object detection sensor 44 operable to detect objects exterior to the vehicle 14, a wireless activity detector 45 operable to detect wireless device usage by a driver, an electronic display 46, a vehicle speaker 48, and/or a Bluetooth module 50.

In one example, the electronic display 46 and speaker 48 are part of a driver information system ("DIS") that provides information about a vehicle status (e.g., speed, engine RPMs, etc.). In this example, the electronic display 46 could be part of a vehicle instrument cluster. As another example, the electronic display 46 could be a center console display that is part of an infotainment system that provides a combination of vehicle information and entertainment information (e.g., current radio station, climate control, and the like). In one example, the ECU 30 is integrated into a DIS ECU (not shown) or the telematics module 32.

In the example of FIG. 2, the ECU 30 is operably connected to the components 32-50 through a vehicle data bus 52, which may be a controller area network ("CAN") bus. Of course, FIG. 2 is only an example, and it is understood that the ECU could connect to certain ones of the components 32-50 through other connections besides the vehicle data bus 52.

Figure 3:
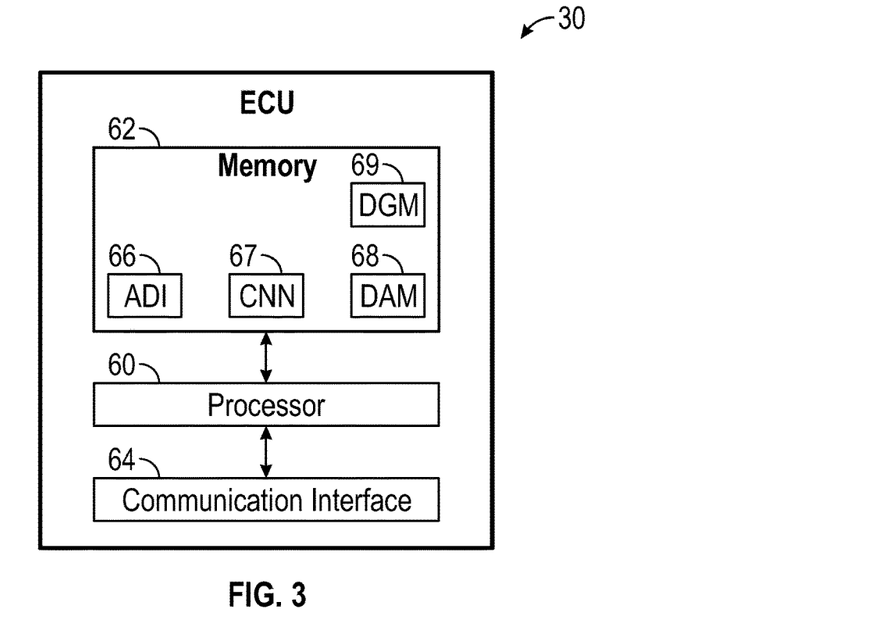
FIG. 3 schematically illustrates an electronic control unit of FIG. 2 in greater detail.

FIG. 3 schematically illustrates the ECU 30 in greater detail. Referring now to FIG. 3, the ECU 30 includes a processor 60 operatively connected to memory 62, and a communication interface 64. The processor 60 includes one or more processing circuits, such as microprocessors, microcontrollers, application specific integrated circuits (ASICs), or the like. The memory 62 may include one or several types of memory such as read-only memory (ROM), random-access memory, cache memory, flash memory devices, optical storage devices, etc. The memory 62 includes a local repository 66 of anomalous driving images, and optionally may also include a convolutional neural network ("CNN") 67, a driver attention model 68, and/or a driver gaze model 69. The CNN 67 is operable to detect whether a driver is utilizing a mobile device in a cabin of the vehicle 14. As used herein, a "mobile device" refers to a handheld electronic device such as a cellular phone, smartphone, tablet, personal media player, or the like. Although depicted as being part of the ECU 30, it is understood that the CNN 67 could instead be stored external to the vehicle 14, such as in the fleet management server 18. The communication interface 64 provides for communication between the ECU 30 and other components (e.g., a wired connection to the vehicle data bus 52).

Referring now to FIG. 2, with continued reference to FIG. 3, the cabin camera 34, which may be a gaze tracking camera, is configured to record images of a driver within a cabin of the vehicle 14, and each of the sensors 36-44 is configured to detect an anomalous driving event of the vehicle based on predefined criteria corresponding to distracted driving.

Based on detection of an anomalous driving event by one of the sensors 36-44, the ECU 30 is operable to obtain a particular image taken by the cabin camera 34 that depicts the driver during the anomalous event. The ECU 30 transmits the particular image to the fleet manager 22 using the telematics module 32 and/or stores the particular image in the local repository 66 of anomalous driving images.

The acceleration sensor 36 is configured to detect an anomalous acceleration event, such as rapid acceleration or deceleration of the vehicle 14, which could be indicative of distracted driving. The predefined criteria for the acceleration sensor 36 could include a rate of acceleration above a predefined acceleration threshold or a rate of deceleration below a predefined deceleration threshold, for example.

The steering angle sensor 38 is configured to detect an anomalous steering event, such as a rapid steering wheel angle change that could be indicative of swerving. For example, the predefined criteria for the steering angle sensor 38 could include a change in steering angle beyond a predefined angle threshold within a predefined time period while the vehicle 14 is traveling at a speed above a predefined speed threshold, which could be indicative of swerving as a result of distracted driving.

The braking sensor 40 is configured to detect an anomalous braking event, such as rapid braking of the vehicle 14, and could be configured to measure changes in vehicle velocity, and/or control signals transmitted to a vehicle braking system, for example.

The object detection sensor 44 may be a LIDAR ("light detection and ranging") or RADAR ("radio detection and ranging") sensor, for example. The object detection sensor 44 can be used on its own, or in conjunction with the ECU 30, to detect near-collision incidents in which a collision was narrowly avoided.

The telematics module 32 includes a wireless transceiver operable to transmit images through the WAN 16. In one example, the telematics module 32 is configured to use a predefined protocol standard such as one or more of the 802.11 standards and/or one or more cellular standards (e.g., GSM, CDMA, LTE, etc.).

The wireless activity detector 45 includes an antenna configured to detect radio signals, and includes related processing circuitry for determining if a detected radio signal represents mobile device usage within a cabin of the vehicle 14 based on one or more predefined thresholds. The criteria used by the processing circuitry of wireless activity detector 45 could include any one or combination of the following: signal strength, signal duration, and mobile device identifier. Some example mobile device identifiers could include an international mobile subscriber identity ("IMSI"), an Internet protocol ("IP") address, a media access control ("MAC") address, and if a mobile device identifier associated with the driver is detected, it is more likely that the signal transmission corresponds to mobile device usage by the driver and not a pedestrian or driver of a nearby vehicle.

In one example, signal duration is used to distinguish between background activity, such as handovers between adjacent cells, where a driver is not actually using the mobile device, and active use of the mobile device (e.g., phone calls, video streaming, etc.) where the signal duration is more likely to exceed a predefined signal length threshold.

In one example, the wireless activity detector 45 is configured to limit its monitoring to frequency bands linked to known telecommunication standards, such as GSM band(s), CDMA band(s), LTE band(s), WiMax band(s), WiFi band(s), etc. In one example, the wireless activity detector 45 includes a plurality of antennas, each tuned for a particular one or set of frequency bands, and/or includes one or more antennas configured to sweep a plurality of such frequency bands.

In one example, the wireless activity detector 45 is configured to base its detection at least in part on signal strength, as a signal detected from a mobile device in the vehicle cabin is likely to be stronger than that of a mobile device in a neighboring vehicle.

In one example, the cabin camera 34 is a video camera operable to provide a rolling buffer of a predefined duration (e.g., 30 seconds) that overwrites itself if not backed up, and the ECU 30 is operable to obtain images from frames of the rolling video buffer within a time window corresponding to an anomalous driving event. This could also provide an opportunity to preserve video leading up to an anomalous driving event to see what occurred during and prior to the anomalous driving event.

In one example, the ECU 30 is configured to record additional images depicting the driver from the cabin camera 34 at random intervals which may occur outside of anomalous driving events, and transmit the additional images to the fleet manager 22, store the additional images in the local repository 66 of anomalous driving images, or both. This random sampling could provide an additional level of compliance for the driver.

In one example, the ECU 30 is configured to adjust the predefined criteria used for determining anomalous driving events based on at least one of traffic density, weather conditions, and object detection in the vicinity of the vehicle 14. For example, in adverse weather conditions (e.g., rain, snow, icy roads) and or high-traffic or high-pedestrian areas, the thresholds used for determining what constitutes anomalous driving may be lowered from default values to a more stringent standard, particularly when the vehicle 14 is a large commercial truck.

The determination of whether weather conditions are adverse could be based on a weather forecast received at the ECU 30, for example. The determination of whether the vehicle 14 is in a high-traffic or high-pedestrian area could be based on, e.g., a traffic report received at the ECU 30 and/or based on object detection from the object detection sensor 44 or exterior camera 42.

Also, the predefined criteria used to detect anomalous driving event could be selected based on an experience level of a driver. This could provide for more stringent standards for less-experienced drivers, and more tolerant standards for experienced drivers.

Figure 4:
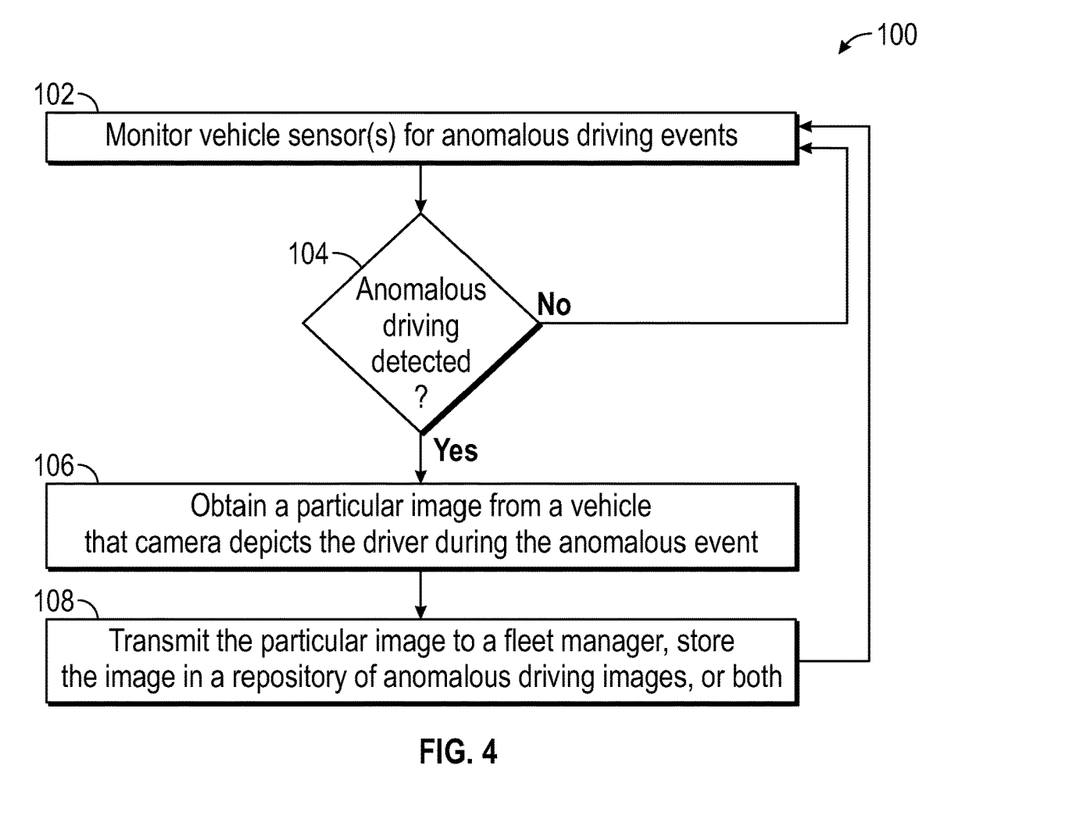
FIG. 4 is a flowchart of an example method of monitoring a driver.

FIG. 4 is a flowchart of an example method 100 of monitoring a driver. The ECU 30 monitors one or more vehicle sensors (e.g., sensors 36-44) for anomalous driving events (step 102). If no anomalous driving event is detected (a "no" to step 104), the ECU 30 keeps monitoring for anomalous driving events. If an anomalous driving event is detected (a "yes" to step 104), the ECU 30 obtains a particular image from the cabin camera 34 that depicts the driver during the anomalous event (step 106). The ECU 30 transmits the particular image to the fleet manager 22 and/or stores the image in the local repository 66 of anomalous driving images, and then resumes monitoring the vehicle sensors for anomalous driving events (step 102).

In some embodiments, the cabin camera 34 is a gaze tracking camera configured to record images of a driver within a cabin of the vehicle 14 and determine a gaze direction of the driver in the recorded images. Such cameras are commercially available from SmartEye (https://smarteye.se/) and EyeSight (http://w ww.eyesight-tech.com/). In one example, the cabin camera 34 detects gaze by directing infrared or near-infrared light to a user's eye, and then measuring the reflection of that infrared light back from the driver's eye. Based on the angle of reflection, a gaze direction can be ascertained. In another example, the cabin camera 34 infers the gaze direction of the driver by determining a gaze vector from the general shape of the driver's head and/or the symmetry of the driver's face in a recorded image. Both of these techniques are well known to those of ordinary skill in the art, and therefore are not discussed in detail herein. In one example, the cabin camera 34 is integrated into a driver information system and/or instrument cluster.

Figure 5:
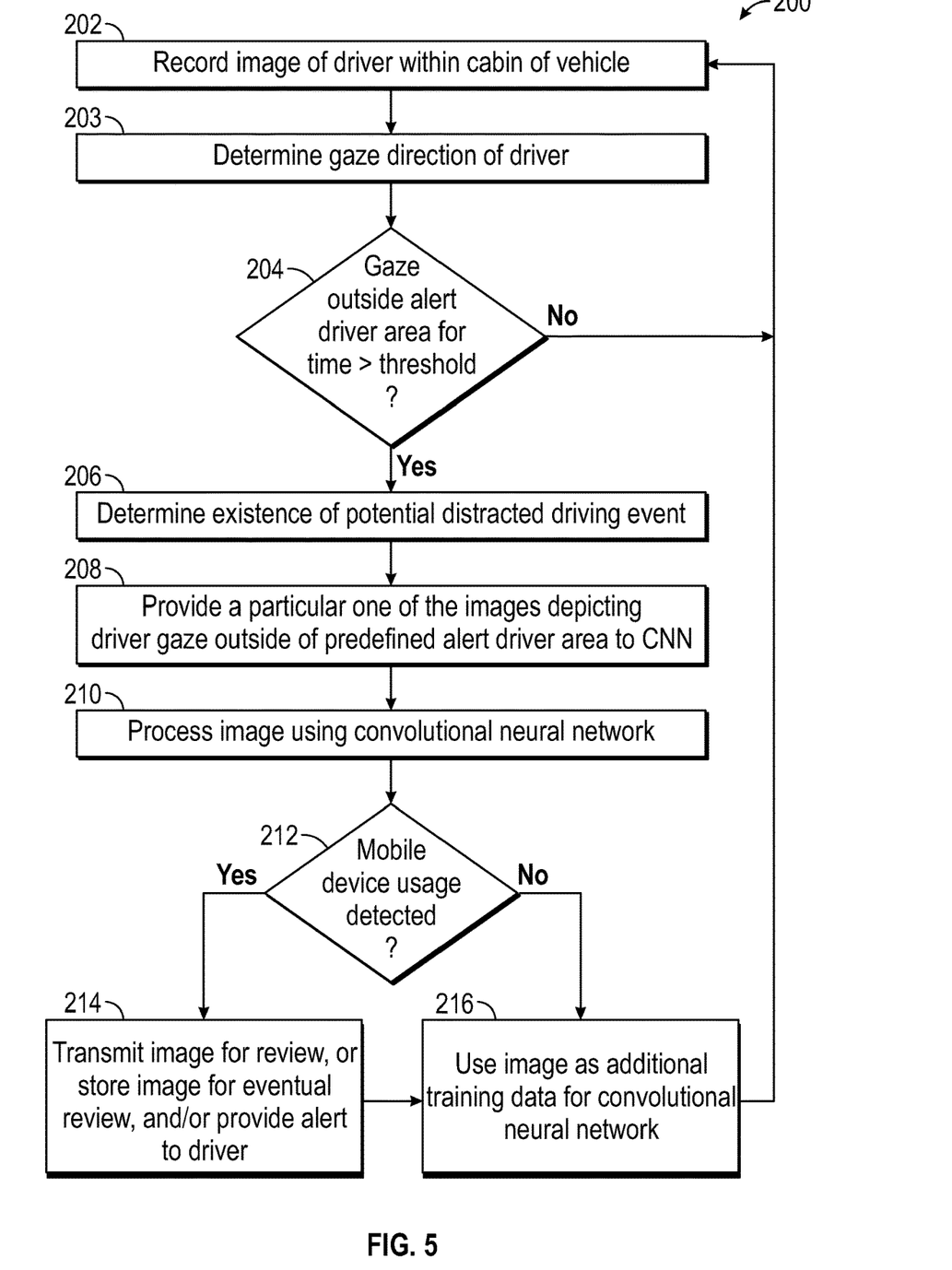
FIG. 5 is a flowchart of another example method of monitoring a driver.

FIG. 5 is a flowchart of an example method 200 of monitoring a driver in which the cabin camera 34 is a gaze tracking camera, and the ECU 30 utilizes a CNN 67. The cabin camera 34 records images of a driver within a cabin of the vehicle 14 (step 202), and determines a gaze direction of the driver in the recorded images (step 203). The ECU 30 determines whether the gaze is outside of a predefined alert driver area for an amount of time that exceeds a predefined time threshold (step 204).

Figure 6:
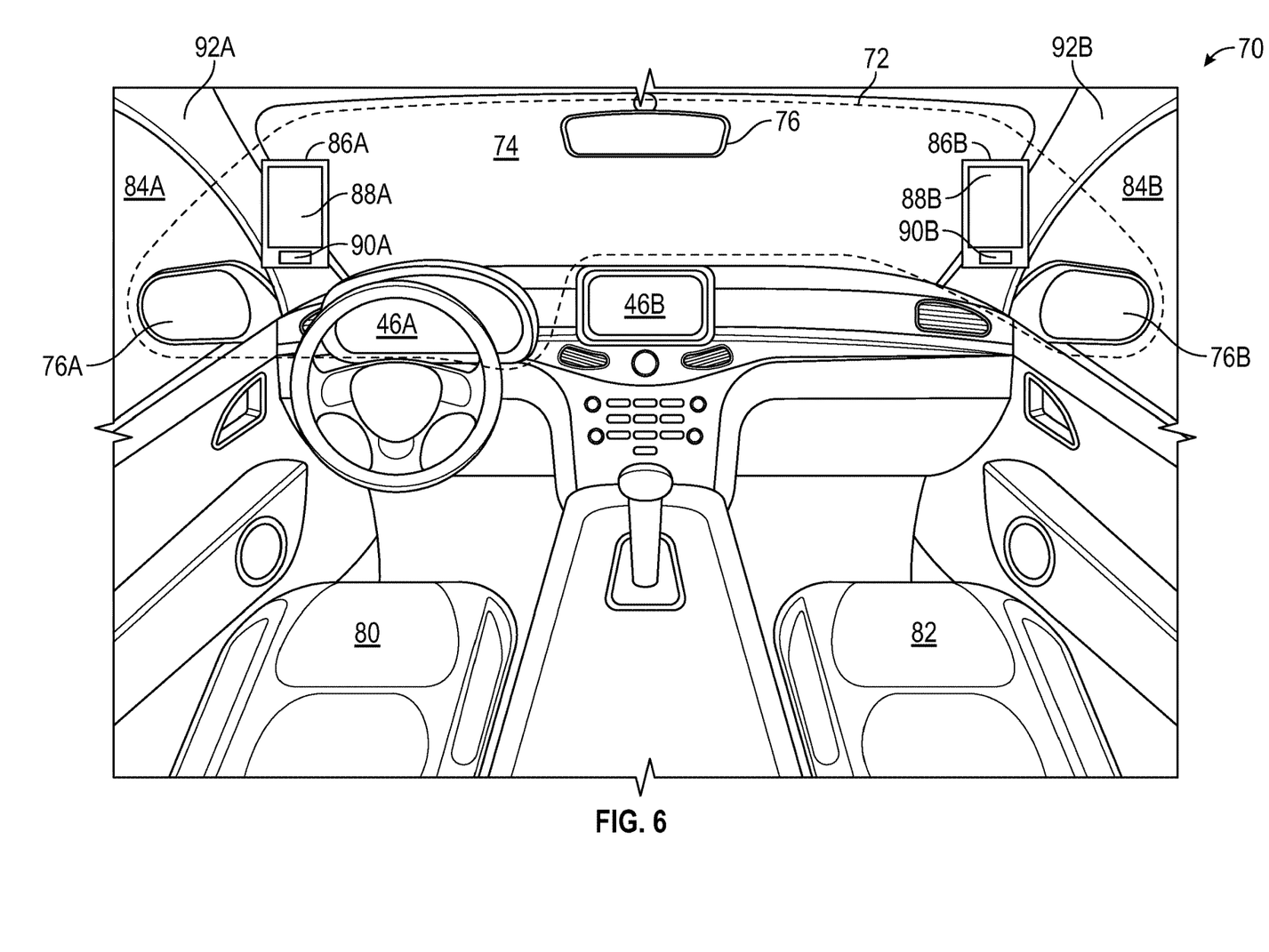
FIG. 6 schematically illustrates an example vehicle cabin.

Referring now to FIG. 6, an example vehicle cabin 70 is schematically shown, along with an example predefined alert driver area 72, which includes a windshield 74, rearview mirror 76, wing mirrors 78A-B, and instrument cluster display 46, but excludes center console display 46B, and other areas that are likely to be indicative of distracted driving and/or mobile device usage, such as the driver's lap area 80, the passenger seat 82, the majority of the driver and passenger windows 84A-B, etc.

In the example of FIG. 6, camera monitor system units 86A-B, which are mounted to pillars 92A-B, are provided within the alert driver area 72. Each camera monitor system unit 86A-B includes a respective electronic display 88A-B for providing an external vehicle video feed, and may optionally also include a respective camera 90A-B (which optionally may be used as the cabin camera 34 of FIG. 2 if desired). Utilizing the cameras 90A-B could be useful for retrofitting aspects of the driver monitoring system 24 into existing vehicles, where modifications to the existing software for an existing vehicle camera may be impractical. In one example, the camera monitor system units 86A-B are part of the MIRROREYE system from Stoneridge, Inc.

Referring again to FIG. 5, with continued reference to FIG. 6, if the driver's gaze is within the alert driver area 72, or is only outside of the alert driver area 72 for an amount of time less than the predefined time threshold (a "no" to step 204), then the ECU 30 resumes monitoring the gaze direction of the driver.

Conversely, if the ECU 30 determines in step 204 that the driver's gaze is outside of the alert driver area 72 for an amount of time greater than the predefined time threshold (a "yes" to step 204), then the ECU 30 determines that the gaze corresponds to a potential distracted driving event (step 206), and provides a particular image of the driver when the driver's gaze direction is outside of the alert driver area 72 to the CNN 67 (step 208).

The CNN 67 is trained with images depicting drivers utilizing mobile devices, and the ECU 30 utilizes the CNN 67 to process the image and determine if the driver is utilizing a mobile device in the particular image (step 210). The training image set could include images of drivers texting, talking on the phone while holding the phone up to their face, having a hand near their face in a position suggesting phone usage (even if a phone is not visible), etc. Use of the CNN 67 helps to reduce false positive detections of distracted driver events.

If mobile device usage is detected (a "yes" to step 212), the ECU 30 performs one or more predefined actions based on the potential distracted driving event, such as transmitting the image to the fleet manager 22 for review, storing the image for eventual review in the local repository 66 of anomalous driving, and/or providing an alert to the driver (step 214). The alert could be provided as an audio notification through vehicle speaker 48, as an audio notification to a wireless headset worn by the driver (e.g., using Bluetooth module 50), and/or a visual notification on the electronic display 46 within the cabin 70, for example. The particular image can then be used as additional training data for the CNN 67 (step 216) as part of a supervised machine learning process.

Alternatively, if mobile device is not detected (a "no" to step 212), one or more (e.g., all) of the predefined actions are omitted, and the ECU 30 proceeds to step 216.

In a similar fashion to how the ECU 30 can adjust the anomalous driving detection thresholds, the ECU 30 can also adjust the thresholds use for determining when a driver's gaze is indicative of distracted driving and/or mobile device usage. For example, in certain environments, such as adverse weather conditions (e.g., rain, snow, icy roads) and or high-traffic or high-pedestrian areas, the alert driver area 72 could be narrowed from a default area and/or the time threshold used in step 204 could be shortened from a default value to enforce a more stringent level of driver attention. Conversely, in low-traffic and/or favorable weather conditions (i.e., non-icy, non-snowy, non-slippery) the alert driver area 72 could be expanded and/or the time threshold of step 204 could be lengthened.

In one example, the ECU 30 is configured to select one or both of the predefined time threshold of step 204 and the alert driver area 72 based on an experience level of the driver. This could provide for more stringent standards for less-experienced drivers, and more tolerant standards for experienced drivers Similarly, the threshold for when an alert is provided to a driver in step 214 could be selected based on driver experience level, with the understanding that such warnings may be more appropriate and/or useful for drivers with less experience than they would be for drivers with more experience.

As discussed above, the ECU may include a driver attention model 68 and/or a driver gaze model 69. Use of such models could provide an additional layer of refinement for the driver monitoring system 24, for example, by correlating gaze direction with external objects and determining if drivers are fixating on certain objects when they should be gazing at other relevant objects in the area surrounding the vehicle. For example, the rapid movement of gaze direction from side to side could indicate a distracted driving event, even though the driver's gaze is focused externally to the vehicle (as their attention is not fixated on any situation long enough to indicate driver attention). Furthermore, the attention model indicating extended focus on a point near the driver's knee could indicate that the driver is utilizing the phone to access the internet while driving.

Figure 7:
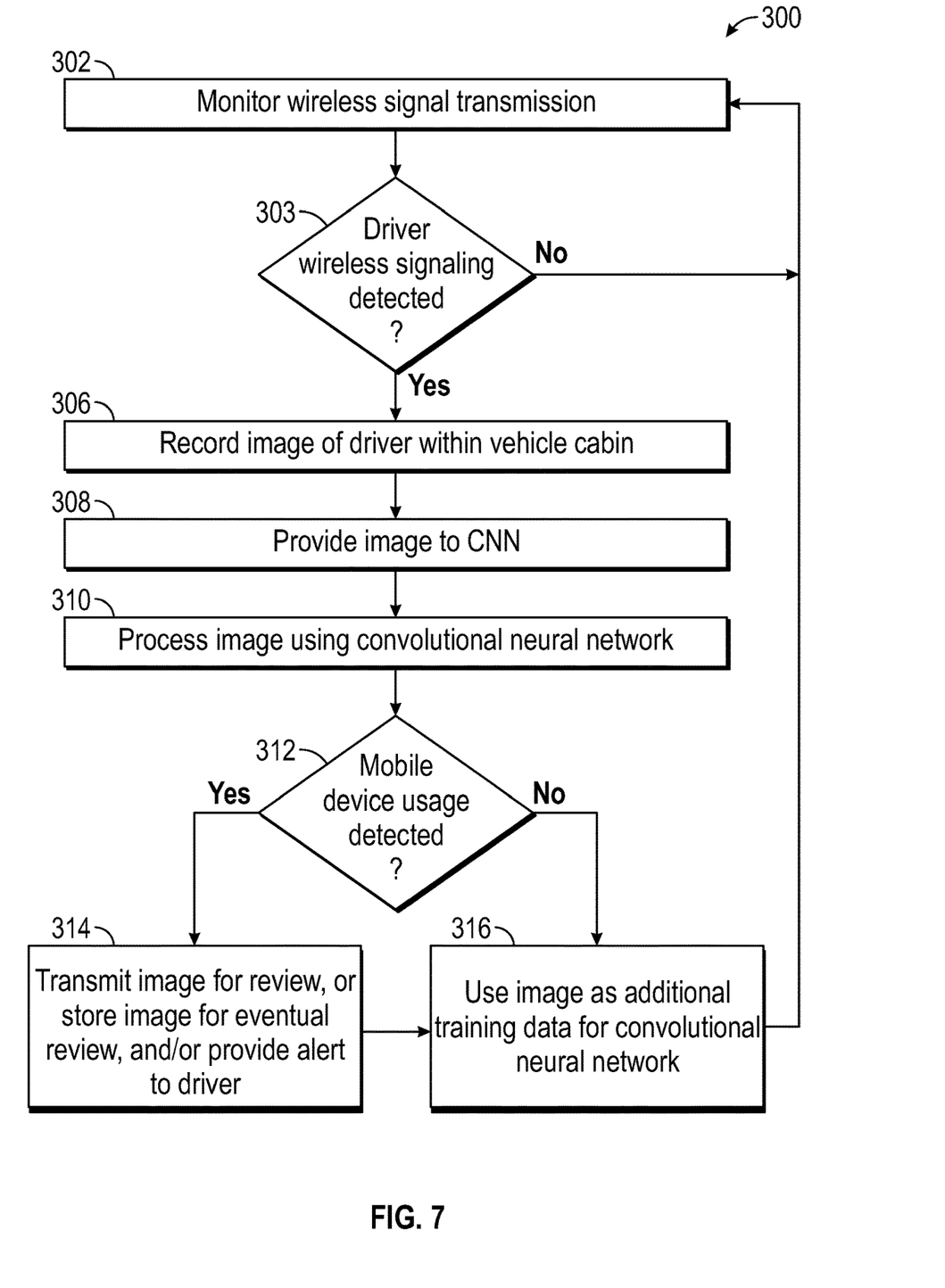
FIG. 7 is a flowchart of another example method of monitoring a driver.

FIG. 7 is a flowchart of another example method 300 of monitoring a driver in which the wireless activity detector 45 is used to monitor wireless signal transmissions based on any of the predefined criteria discussed above (e.g., signal strength, signal duration, and mobile device identifier) (step 302). If wireless signaling from a driver mobile device is detected (a "yes" to step 303), an image is recorded of the driver within the vehicle cabin 70, and the image is provided to the CNN 67 (step 308). Steps 310-316 are performed in the same manner as steps 210-216 as described above.

In one example, the CNN 67 is omitted, the ECU 30 just transmits the recorded image in step 306 for review, or stores the image for eventual review.

In one example, if the driver's mobile device is paired with the vehicle infotainment system or a headset (e.g., through Bluetooth), steps 306-316 are skipped. In one example, the wireless activity detector 45 detects whether the mobile device is paired with a headset and/or the infotainment system by monitoring for transmissions on a Bluetooth frequency band.

In one example, steps 302-303 are used in the method 200 as an additional layer of detection prior to utilizing the CNN 67 (e.g., between steps 206 and 208, such that the particular image is only provided to the CNN 67 if the wireless activity detector 45 corroborates the potential distracted driving event by detecting evidence of wireless signaling from a driver mobile device.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A driver monitoring system, comprising:
a gaze tracking camera configured to record images of a driver within a cabin of a vehicle and determine a gaze direction of the driver in the recorded images; and
a controller in communication with the gaze tracking camera, operatively connected to memory, and configured to:
detect a potential distracted driving event based on the gaze direction of the driver as depicted in a particular image of the recorded images being outside of a predefined alert driver area for an amount of time exceeding a predefined time threshold;
provide the particular image to a convolutional neural network that has been trained with images depicting drivers utilizing mobile devices;
determine, based on feedback from the convolutional neural network, whether the driver is utilizing a mobile device in the particular image;
based on the determination indicating that the driver is utilizing the mobile phone in the particular image, perform one or both of the following predefined actions: transmit the particular image to a fleet manager, and store the particular image in a local repository of anomalous driving images in the memory;
based on the determination indicating that the driver is not utilizing the mobile phone in the particular image, omit performance of said one or both of the predefined actions, and further train the convolutional neural network using the particular image;
adjust one or both of the predefined time threshold and the predefined alert driver area based on at least one of traffic density, weather conditions, object detection external to the vehicle, and a geographic location of the vehicle; AND
select one or both of the predefined time threshold and the predefined alert driver area based on an experience level of the driver.

2. The driver monitoring system of claim 1, wherein the controller is configured to transmit one or more of the following distracted driving alerts to the driver based on the potential distracted driving event:
an audio notification through a vehicle speaker;
an audio notification to a wireless headset worn by the driver; and
a visual notification on an electronic display within the cabin.

3. The driver monitoring system of claim 1, wherein the gaze tracking camera is a video camera, and the images are recorded in a video feed from the video camera.

4. The driver monitoring system of claim 1, wherein the controller is configured to:
obtain additional images depicting the driver from the gaze tracking camera, or another camera, at random intervals; and
transmit the additional images to a fleet manager, store the additional images in the local repository of anomalous driving images, or both.

5. The driver monitoring system of claim 1, wherein the controller is configured to transmit the particular image to the fleet manager based on the detection of the potential distracted driving event.

6. The driver monitoring system of claim 1, wherein the controller is configured to adjust one or both of the predefined time threshold and the predefined alert driver area based on traffic density.

7. The driver monitoring system of claim 1, wherein the controller is configured to adjust one or both of the predefined time threshold and the predefined alert driver area based on weather conditions.

8. The driver monitoring system of claim 1, wherein the controller is configured to adjust one or both of the predefined time threshold and the predefined alert driver area based on object detection of objects external to the vehicle.

9. The driver monitoring system of claim 1, wherein the controller is configured to adjust one or both of the predefined time threshold and the predefined alert driver area based on a geographic location of the vehicle.

10. A method of monitoring a driver, comprising:
a gaze tracking camera recording images of a driver within a cabin of a vehicle and determining a gaze direction of the driver in the recorded images; and
an electronic control unit:
detecting a potential distracted driving event based on the gaze direction of the driver, as depicted in a particular image of the recorded images, being outside of a predefined alert driver area for an amount of time exceeding a predefined time threshold;
providing the particular image to a convolutional neural network that has been trained with mobile device usage images depicting drivers utilizing mobile devices;
determining, based on feedback from the convolutional neural network, whether the driver is utilizing a mobile device in the particular image;
based on the determination indicating that the driver is utilizing the mobile phone in the particular image, performing at least one of the following predefined actions: transmitting the particular image to a fleet manager; and storing the particular image in a local repository of anomalous driving images in memory;
based on the determination indicating that the driver is not utilizing the mobile phone in the particular image, omitting performance of said one or both of the predefined actions, and further training the convolutional neural network using the particular image;
adjusting one or both of the predefined time threshold and the predefined alert driver area based on at least one of traffic density, weather conditions, object detection external to the vehicle, and a geographic location of the vehicle; AND
selecting one or both of the predefined time threshold and the predefined alert driver area based on an experience level of the driver.

11. The method of claim 10, wherein said performing at least one of the following predefined actions comprises transmitting the particular image to the fleet manager.

12. A driver monitoring system, comprising:
a gaze tracking camera configured to record images of a driver within a cabin of a vehicle and determine a gaze direction of the driver in the recorded images; and
a controller in communication with the gaze tracking camera, operatively connected to memory, and configured to:
detect a potential distracted driving event based on the gaze direction of the driver as depicted in a particular image of the recorded images being outside of a predefined alert driver area for an amount of time exceeding a predefined time threshold; and
perform one or both of the following predefined actions based on the detection of the potential distracted driving event: transmit the particular image to a fleet manager, and store the particular image in a local repository of anomalous driving images in the memory;
wherein the controller is configured to perform at least one of:
adjust one or both of the predefined time threshold and the predefined alert driver area based on at least one of traffic density, weather conditions, object detection external to the vehicle, and a geographic location of the vehicle; and
select one or both of the predefined time threshold and the predefined alert driver area based on an experience level of the driver.

13. A method of monitoring a driver, comprising:
a gaze tracking camera recording images of a driver within a cabin of a vehicle and determine a gaze direction of the driver in the recorded images; and
an electronic control unit:
detecting a potential distracted driving event based on the gaze direction of the driver as depicted in a particular image of the recorded images being outside of a predefined alert driver area for an amount of time exceeding a predefined time threshold; and
performing one or both of the following predefined actions based on the detection of the potential distracted driving event: transmit the particular image to a fleet manager, and store the particular image in a local repository of anomalous driving images in the memory;
performing at least one of:
adjust one or both of the predefined time threshold and the predefined alert driver area based on at least one of traffic density, weather conditions, object detection external to the vehicle, and a geographic location of the vehicle; and
select one or both of the predefined time threshold and the predefined alert driver area based on an experience level of the driver.

* * * * *

UNITED STATES PATENT AND TRADEMARK OFFICE
CERTIFICATE OF CORRECTION

PATENT NO. : 12,014,613 B2
APPLICATION NO. : 16/845228
DATED : June 18, 2024
INVENTOR(S) : Schumacher et al.

Page 1 of 1

It is certified that error appears in the above-identified patent and that said Letters Patent is hereby corrected as shown below:

In the Claims

Claim 1, Column 10, Lines 21 and 28, change "mobile phone" to --mobile device--

Claim 10, Column 11, Lines 31 and 37, change "mobile phone" to --mobile device--

Signed and Sealed this
Twenty-third Day of July, 2024

Katherine Kelly Vidal
*Director of the United States Patent and Trademark Office*